United States Patent
Roberts et al.

(10) Patent No.: US 10,372,933 B2
(45) Date of Patent: *Aug. 6, 2019

(54) MULTI-PARTY SECURE INFORMATION INTEGRATION SYSTEM

(71) Applicant: Branch Banking and Trust Company, Winston-Salem, NC (US)

(72) Inventors: Candice Roberts, Wake Forest, NC (US); Alisha Belk, Raleigh, NC (US); Bhavani Konuru, Raleigh, NC (US)

(73) Assignee: Branch Banking and Trust Company, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,108

(22) Filed: Jul. 17, 2018

(65) Prior Publication Data

US 2018/0322302 A1 Nov. 8, 2018

Related U.S. Application Data

(63) Continuation of application No. 15/284,942, filed on Oct. 4, 2016, now Pat. No. 10,055,605.

(60) Provisional application No. 62/237,892, filed on Oct. 6, 2015.

(51) Int. Cl.
| | |
|---|---|
| *G06F 21/62* | (2013.01) |
| *H04L 29/06* | (2006.01) |
| *G06F 16/25* | (2019.01) |
| *G06F 16/23* | (2019.01) |

(52) U.S. Cl.
CPC ...... *G06F 21/6218* (2013.01); *G06F 16/2379* (2019.01); *G06F 16/25* (2019.01); *H04L 63/08* (2013.01); *H04L 63/10* (2013.01); *G06F 2221/2115* (2013.01)

(58) Field of Classification Search
CPC .. G06F 21/6218; G06F 16/2379; G06F 16/25; G06F 2221/2115; H04L 63/10; H04L 63/08
See application file for complete search history.

(56) References Cited

U.S. PATENT DOCUMENTS

| | | | | |
|---|---|---|---|---|
| 2013/0346320 | A1* | 12/2013 | Jin | G06Q 40/02 705/76 |
| 2015/0066719 | A1* | 3/2015 | Agrawal | G06Q 40/02 705/35 |

* cited by examiner

*Primary Examiner* — Ali S Abyaneh
*Assistant Examiner* — Huan V Doan
(74) *Attorney, Agent, or Firm* — Kilpatrick Townsend & Stockton LLP

(57) ABSTRACT

A method of the present disclosure includes a host system authenticating a user of the user device to access secure host information associated with the user in a database. A request may be transmitted to a third-party system to access secure third-party information stored by the third party based on third-party authentication information. The host system may receive the secure third-party information and store the secure third-party information in a memory location of the database that is associated with a different memory location including the secure host information. The memory location and the different memory location may be associated in the database based on a common information type. The host system may generate a graphical user interface that positions the secure host information and the secure third-party information in the graphical user interface based on their respective location in the database.

20 Claims, 8 Drawing Sheets

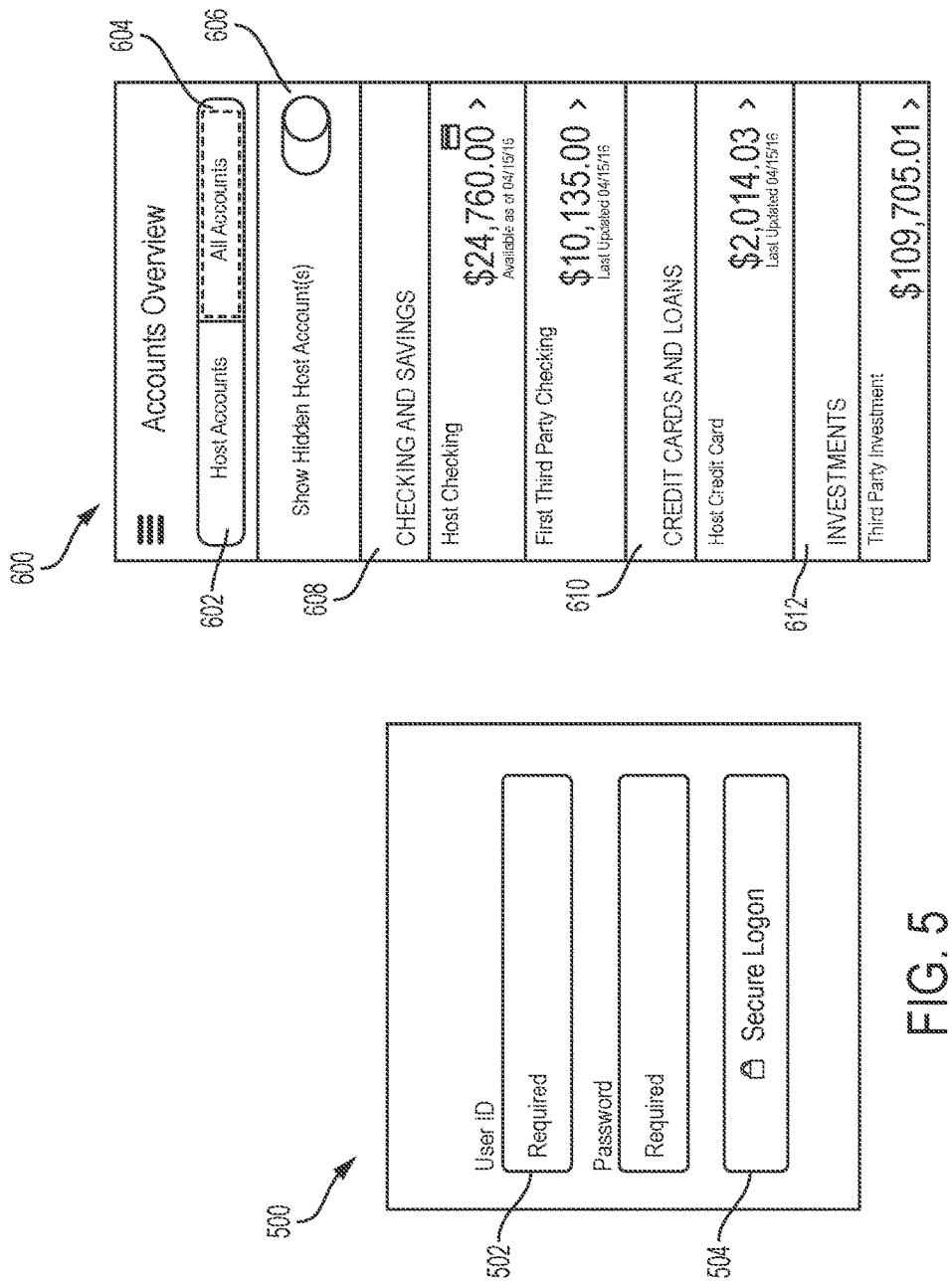

FIG. 10

Update Account Credentials
We could not update your account because your username and/or password were reported to be incorrect.

Please verify and update your log on information.

△ Update Account

Checking
$1,000.00
As of 2 weeks ago

Savings
$1,600.00
As of 08/29/2016

Total
△ $47,673.46

Note: Hidden accounts not included in total

Open a new account

Link an Account

MULTI-PARTY SECURE INFORMATION INTEGRATION SYSTEM

CROSS-REFERENCE TO RELATED APPLICATION

This application is a continuation of U.S. Pat. No. 10,055,605, filed on Oct. 4, 2016, which claims priority to U.S. Provisional Application Ser. No. 62/237,892, filed Oct. 6, 2015 and titled "Multi-Party Secure Information Integration System," each of which is incorporated herein by reference in its entirety.

TECHNICAL FIELD

The present disclosure relates to information security, and more particularly, though not necessarily exclusively, to secure information integration systems for integrating secure information from multiple sources.

BACKGROUND

Certain information is sensitive, requiring authentication processes to secure the information stored in a database and ensure that the stored information is accessible only to authorized users of a web-based platform. For example, a user seeking to access the stored information from a user device via a network may enter authentication information, such as a user name or password specific to the user or information, prior to the database allowing access to the information. Certain database associations between the authentication information and the stored secure information may be used to maintain the security of the information

SUMMARY

In some aspects, a system may include a processor and a memory device. The processor may be coupled to a database having a plurality of memory locations. The memory device may be accessible to the processor and include instructions that may be executed by the processor to cause the processor to receive (i) secure host information corresponding to a user and hosted on the system by a host party and (ii) secure third-party information corresponding to the user and hosted on a third-party system by a third party. The instructions may also be executed by the processor to cause the processor to create a secure database. The database may be created by storing the secure host information and the secure third-party information in a subset of memory locations of the plurality of memory locations. The database may also be created by associating memory locations of the subset with each other based on a common information type corresponding to a common type of the secure host information and the secure third-party information stored in the subset. The database may also be created by associating the subset with an additional memory location of the plurality of memory locations having a stored user identifier corresponding to the user. The additional memory location may be associated with an additional subset of memory locations of the plurality of memory locations.

In certain aspects, the additional subset of memory locations may include stored host authentication information that may be used to authenticate the user to access the host secure information on a host website hosted by the host party. The additional subset of memory locations may also include stored third-party authentication information that may be used to authenticate the system to retrieve updated secure third-party information from the third-party system. The instructions may also be executed by the processor to cause the processor to create a graphical user interface that includes the secure host information and the secure third-party information positioned on the graphical user interface based on a location of the secure host information and the secure third-party information in the database. The graphical user interface may be displayed on the host website and accessible to the user subsequent to authenticating the user based on the host authentication information.

In additional aspects, a method may include authenticating, by a host system communicatively coupled to a user device via a network, a user of the user device to access secure host information associated with the user in a database. The method may also include transmitting, by the host system, a request to a third-party system to access secure third-party information stored by the third-party, the request including third-party authentication information associated with the user in the database for authenticating the host party by the third-party system. The method may also include receiving, by the host system, the secure third-party information from the third-party system. The method may also include storing, by the host system, the secure third-party information in a memory location of the database that is associated with a different memory location including the secure host information, the memory location and the different memory location being associated in the database based on a common information type corresponding to a common type of the secure host information and the secure third-party information. The method may also include generating, by the host system, a graphical user interface including the secure host information and the secure third-party information positioned in the graphical user interface based on the location of the secure host information and the secure third-party information stored in the database.

In further aspects, a host system may include a database hosted by a host system. The database may include a plurality of memory locations for storing (i) secure host information and (i) secure third-party information received from a third-party system that is separate from the host system. The plurality of memory locations may include a subset of memory locations associated with each other based on a common information type corresponding to a common type of the secure host information and the secure third-party information stored in the subset of memory locations. In certain aspects, the subset of memory locations may be used by a processor communicatively coupled to the database to create a graphical user interface that includes the secure host information and the secure third-party information in positions that are based on a location of the secure host information and the secure third-party information in the database.

BRIEF DESCRIPTION OF THE DRAWINGS

FIG. 5 is an example of a user interface for receiving authentication information according to one aspect of the present disclosure.

FIG. 6 is an example of a user interface displaying integrated secure information separated by an information type according to one aspect of the present disclosure.

FIG. 10 is an example of a user interface showing outdated secure third-party information according to one aspect of the present disclosure.

DETAILED DESCRIPTION

Figure 1:
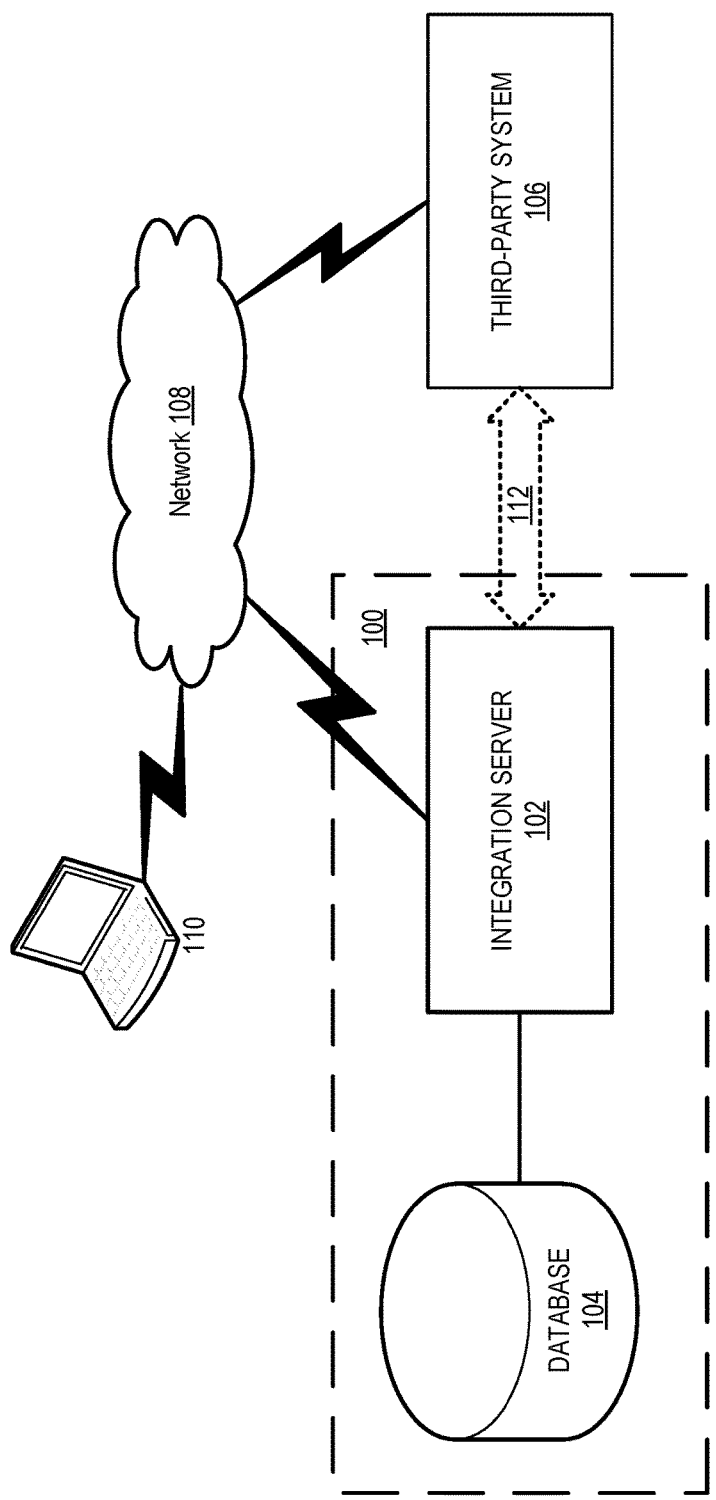
FIG. 1 is a schematic block diagram of an example of a host integration system for integrating secure information from multiple parties according to one aspect of the present disclosure.

Certain aspects and features relate to integrating secure host information managed by a host system with additional secure information managed by one or more third-party systems by generating graphical user interfaces that include the secure host information and the secure third-party information positioned based on the memory locations of the secure information in a database. In some aspects, the host system may create the database with multiple memory locations and may store portions of the secure host information and the secure third-party information in subsets of the memory locations that are separated based on an information type corresponding to the secure information. The graphical user interface generated by the host system may replicate the subsets of the memory locations by displaying the secure information stored in each subset in groups corresponding to each subset.

In some aspects, the host system may securely store information belonging to clients of a host party and may allow the clients to store, access, and manage the client's information remotely via a network. The third-party system may similarly store secure information belonging to clients of a third party and allow such clients to store, access, and manage the client's information remotely via the network. The host system and the third-party system may be disparate systems that are communicatively coupled via the network. The communication path between the host system and the third-party system may allow secure information corresponding to an overlapping client (e.g., a client of both the host party and the third party) to be transmitted from the third-party system to the host system and stored in the memory locations of the database.

The memory locations of the database may correspond to virtual or physical locations for storing user information corresponding to clients of the host system and third-party system. For example, a virtual location may include an allocated storage location within a virtual storage environment (e.g., a virtual database on a cloud) that is accessible to the user. A physical location may include an allocated storage location with a physical storage environment (e.g., a physical database). The memory locations may be associated with a user identifier corresponding to the user, or client, to whom the secure information corresponds. The user identifier may be used to associate the secure information with authentication information that is usable to secure the information in the database by requiring user authentication to access the information. In one example, the authentication information includes host authentication information for authenticating the user on the host system and third-party authentication information for authentication the user on the third-party system. The host authentication and the third-party authentication information may be associated with each other in the database directly or via the user identifier to allow the host system to use the third-party authentication information to retrieve updated third-party information from the third party on behalf of the user subsequent to authenticating the user by the host system.

In additional aspects, the host system may generate user interfaces displaying integrated secure information including the secure third-party information and the secure host information with selection options to allow the user to modify the secure third-party information. In response to a request to modify the secure third-party information via selection of one of the options generated by the host system, the host system may transmit an electronic signal to the third-party system. The electronic signal may include the third-party authentication information to authenticate the user and user interface components to allow the third-party system to generate a user interface for modifying the secure third-party information. The interface components may include programming code for generating headers, icons, and other visual elements to allow the third-party system to generate the user interface for modifying the secure third-party information. The visual elements included on the user interface generated by the third party may cause the user interface to appear to be a user interface generated by the host system. Subsequent to modifying the secure host information or the secure third-party information, the system may generate a user interface to display updated integrated secure information including any updated secure third-party information or secure host information.

Since the host system is a host to at least a portion of the secure information, the host system can ensure that appropriate authentication is implemented to provide the third-party information to the user in a manner as secure as if the user were accessing the third-party information directly from the third-party system. For example, the system may associate third-party authentication information provided to the system by the user with authentication information provided to the system for accessing the secure host information directly accessible by the system. The authentication of the user to view the secure information hosted by the system may then serve as authentication of the same user to view third-party information hosted on a third-party system.

In some aspects, the associations between the memory locations of a database including the secure information may allow the host system to create relationships between disparate secure information received from different sources (e.g., based on a common information type). The relationships may be created while simultaneously maintaining an ability to distinguish between the source of the information stored in each of the associated memory locations. The ability to create relationships between the secure information in the database may allow the information to be presented to a user in an organized fashion with reduced processing time. For example, a processor generating a graphical user interface that displays the secure information stored in the database may rely on the database associations to organize the information rather than use additional processing power and time to determine the relationships between the secure information upon each user request to view the secure information. This may be particularly useful to prevent overburdening the processor when the processor is handling multiple user requests for secure information simultaneously.

The ability to distinguish between the sources of the information stored in the database (e.g., the host system versus one or more third-party systems) throughout such processing operations may allow the processor to determine quickly whether a user requesting the secure information is authenticated to view the secure information from each of the respective sources. A system according to certain aspects of the present disclosure may be useful for hosting information related to a user interface that the user would deem sensitive in nature. For example, the information may relate to financial information. The system may allow a host financial institution having financial information related to a user to access additional financial information hosted by a third party and to display all of the user's financial information on a single, secure system of the host financial institution.

As one example, a user may attempt to access a web-based system hosted by a financial institution. The system may authenticate automatically the user on the third-party system based on authenticating the user to view the secure information hosted by the financial institution via the system. The system may send a request to the third-party system for financial information, such as account balances for the user's accounts hosted by the third party. The system may also display the third-party account balances on a web user interface generated by the system integrated with account balances for accounts managed or hosted by the host financial institution. To the extent the secure third-party information requires modifying, the system may also provide selection options (e.g., deep links) to allow the user to access the third-party system to make necessary changes to the secure third-party information. The webpage accessible by the deep links may be hosted by the third party, but the system may provide user interface components (e.g. JavaScript, HTML) to allow the third-party system to provide a user interface that appears to be hosted by the host financial institution. This may provide the user with a consistent and controlled user experience. In some aspects, the third-party system may include a deep link back to the system. When the request to return to the system is initiated, the system may update or refresh the secure third-party information to account for the modifications made during the user's visit to the third-party system.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Various aspects of the present disclosure may be implemented in various environments. FIG. 1 shows an example of a network environment including a host system 100 that may be used to integrate secure information from multiple parties with secure information from the host system 100 according to one aspect of the present disclosure. The host system 100 includes an integration server device 102 and a database device 104 managed by a host party. The integration server device 102 is communicatively coupled to the database device 104. The integration server device 102 may include a processing device or other means for managing the security of information stored in the database device 104. For example, the integration server device 102 may authenticate a user to access, view, and modify the information stored in the database device 104. The information stored in the database device 104 may include secure information corresponding to one or more clients of the host party (e.g., the users). The database device 104 may also store user identification information associated with user account information. The user information may include personal identification information related to the user, authentication information unique to the user to allow the user to view secure information via the system, or other information associated with the user.

The integration server device 102 is also communicatively coupled to a third-party system 106 separate from the host system 100 by a network 108, such as the Internet. The third-party system may be hosted by a third party and is physically separate from the host system 100. The host system 100 and the third-party system 106 may include secure information belonging to one or more of the same clients. The third-party system 106 may host and store additional secure information corresponding to the overlapping clients. In some aspects, the third-party system 106 may transmit the secure information hosted by the third party to the host system 100 via the network 108. In additional and alternative aspects, the secure third-party information received from the third-party system 106 may also be stored in the database device 104. Although only one third-party system 106 is shown in FIG. 1, the third-party system 106 may represent multiple third-party systems communicatively coupled to the host system 100 by the network 108. Similarly, though only a single database device 104 is shown in FIG. 1, the database device 104 may represent multiple database devices. In some aspects, the database device 104 may be shared with one or more of the disparate host systems. In other aspects, the database device 104 may be integral to the integration server device 102.

The host system 100 may communicate with user devices 110 operated by the clients, or users, of the host system 100. The integration server device 102 may be communicatively coupled to the user devices 110 via the network 108. The integration server device 102 may generate user interfaces and provide the user interfaces to a user device 110 over the network 108. The integration server device 102 may also receive requests and commands from the user device 110, and configure the user interfaces to be provided to the user device 110 in response to the requests and commands. The user device 110 may be a computing device, such as a laptop, mobile phone, desktop computer, personal digital assistant, tablet, wearable device, etc., that may display content in a web browser or other user interface. In some aspects, the user device 110 may represent multiple user devices communicatively coupled, directly or indirectly, to the host system 100 over the network 108. For example, the user device 110 may represent a wearable device (e.g., a smart watch) communicatively coupled to a mobile phone. The mobile phone may be communicatively coupled to the integration server device 102. The integration server device 102 may receive requests and commands from and provide user interfaces to the wearable device via the mobile phone.

In some aspects, the host system 100 may be communicatively coupled to the third-party system 106 a service bus 112 in addition or alternatively to the network 108. In some aspects, the host system 100 may utilize the service bus 112 or the network 108 to communicate with the third-party system 106 depending on the purpose of the communication. As one example, the integration server device 102 may communicate with the third-party system 106 using the service bus 112 to retrieve secure third-party information from the third-party system 106. The integration server device 102 may communicate with the third-party system 106 using the network 108 to allow a user of the host system 100 to access user interfaces generated by the third-party system 106 for modifying secure third-party information displayed by the system. In another example, the integration server device 102 may communicate with the third-party system 106 using the service bus 112 to transmit user interface components or other proprietary information to allow the third-party system 106 to generate user interfaces that appear to be generated by the system for modifying the secure third-party information. Integration server device 102 may communicate with the third-party system 106 via the network 108 to authenticate the user to view the secure third-party information, retrieve the secure third-party information, or to allow a user of the host system 100 to access user interfaces generated by the third-party system 106 for modifying secure third-party information displayed by the system. In other examples, all communication between the third-party system 106 and the host system 100 may be through only the service bus 112 or the network 108 without departing from the scope of the present disclosure.

Figure 2:
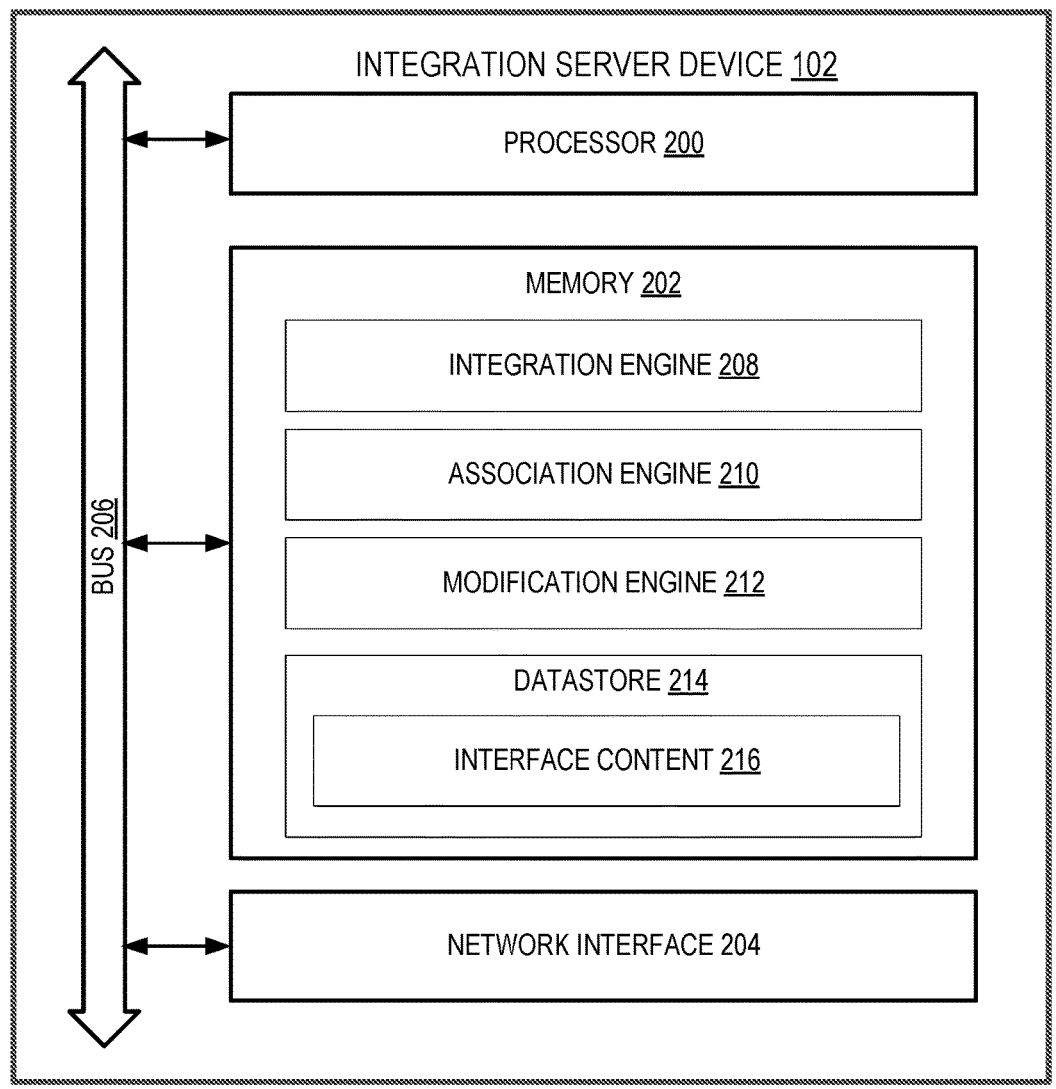
FIG. 2 is a block diagram of an integration server device of FIG. 1 according to one aspect of the present disclosure.

FIG. 2 shows a block diagram of the integration server device 102 of FIG. 1 that may implement an aspect of the present disclosure. The integration server device 102 includes a processor 200, memory 202, and a network interface 204 connected by a bus 206. The processor 200 may execute instructions stored in the memory 202 to perform operations of the integration server device 102. The processor 200 may include a single processing device or multiple processing devices. Non-limiting examples of the processor 200 include a field-programmable gate array, an application-specific integrated circuit ("ASIC"), and a microprocessor. The memory 202 includes a storage device that retains information when powered off. Non-limiting examples of the memory 202 include electrically erasable and programmable read-only memory, a flash memory, or any other type of non-volatile memory.

In some examples, at least a portion of the memory 202 may include a computer-readable medium from which the processor 200 can access and execute instructions of the memory 202. A computer-readable medium may include electrical, optical, magnetic, or other storage devices capable of providing the processor 200 with computer-readable instructions or other program code. Non-limiting examples of a computer-readable medium include magnetic disks, memory chips, read-only memory, random-access memory, an ASIC, a configured processor, optical storage, or any other medium from which the processor 200 may read instructions. The instructions may include processor-specific instructions generated by a compiler or an interpreter from code written in any suitable computer-programming language, including, for example, C, C++, C#, COBOL, Java, etc.

The instructions include one or more applications or other means for instructing the processor 200 to perform the functions of the integration server device 102. In some aspects, the instructions include integration engine 208, association engine 210, and modification engine 212, each including one or more algorithms executable by the processor 200. For example, integration engine 208 may include algorithms or other instructions to cause the processor 200 to determine the memory locations and associations of secure information in the database device 104 of FIG. 1. Based on the memory locations and associations, the integration engine 208 may integrate secure host information stored in the database device 104 with secure third-party information stored in the database device 104. The association engine 210 may receive the secure host information from the host party, or in some instances, the user, and receive the secure third-party information from the third party. The association engine 210 may determine in which memory locations of the database device 104 of FIG. 1 to store the information such that associations between the information are formed in the database device 104. The modification engine 212 may allow the user, the host party, or the third party to modify the secure host information or the secure third party information stored in the database device 104 and may, with or independently from the association engine 210, store the modified secure information in the appropriate memory locations of the database device 104.

The memory 202 also includes a datastore 214 in which content and data may be stored. For example, the datastore 214 include interface content 216 corresponding to web components (e.g., logos, icons, and other web image files), instructions, and other means for generating user interfaces. In some aspects, the user interfaces generated using the interface content 216 may be displayed on a website hosted by the host system 100 of FIG. 1 to allow a user to modify the secure host information stored in the database device 104 of FIG. 1. In additional and alternative aspects, the user interfaces generated using the interface content 216 may be displayed on a website hosted by the third-party system 106 of FIG. 1 to allow a user to modify secure third-party information. Although the interface content 216 is shown as stored in the datastore 214 of the memory 202, the interface content 216 may be similarly stored in the database device 104 of FIG. 1 without departing from the scope of the present disclosure.

The network interface 204 may include a network card or other means for communicatively coupling the host system 100 of FIG. 1 to a network (e.g., network 108 of FIG. 1). For example, the network interface 204 may allow user devices, such as the user device 110, to access the host system 100 to receive user interfaces that allow a user to access, view, and modify secure information. The network interface 204 may also couple the host system 100 to the network to allow information and data to be transmitted between the host system 100 and the third-party system 106 of FIG. 1 via the network 103. In some aspects, the network interface 204 may also include allow for communication between the host system 100 and the third-party system 106 via the service bus 112 of FIG. 1

Figure 3:
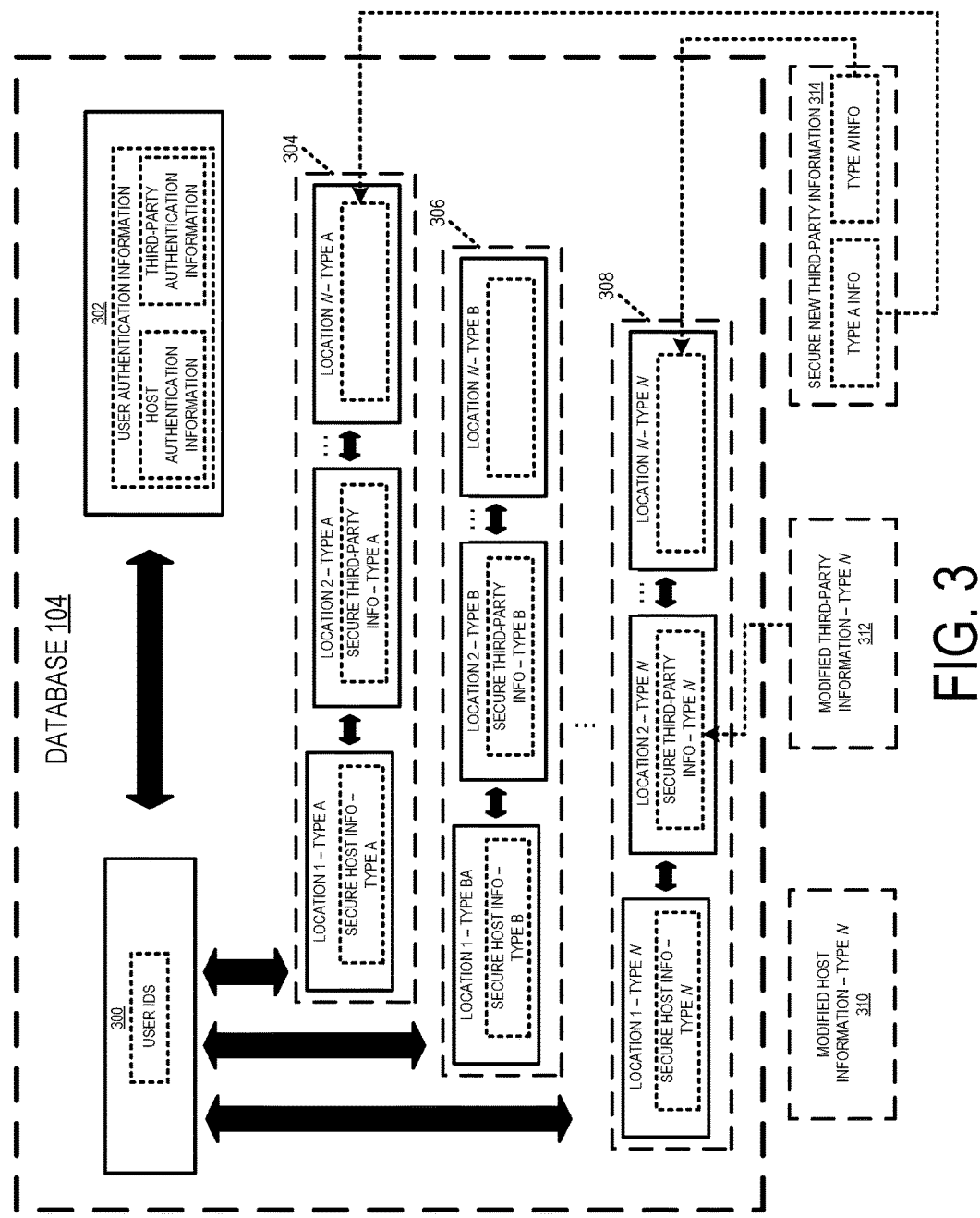
FIG. 3 is a block diagram depicting associations in a database of the integration system of FIG. 1 according to one aspect of the present disclosure.

FIG. 3 is a block diagram of the database 104 of FIG. 1 depicting associations of memory locations and information within in the database 104 according to one aspect of the present disclosure. The database 104 includes stored information, including user identifiers, user authentication information, and secure user information. The stored information is stored in various memory locations of the database 104. Different stored information may be stored in a manner such that the information is associated in the database 104. For example, the memory locations of the database 104 may be associated as represented by the solid arrows in FIG. 3. The stored information may be stored in associated memory locations to associate the information stored therein. In some aspects, one or more memory locations may be associated via a relational table or matrix having rows or columns that are associated, or otherwise linked. In additional and alternative aspects, the memory locations, or the information included therein, may include one or more markers, objects, or other associating means to link the stored information.

In FIG. 3, the client identifiers are stored in a set of memory locations 300. The user identifiers may include information corresponding to an identity of a client, account holder, or member of the host party and user of a user device (e.g., user device 110 of FIG. 1). In some aspects, the user identifiers stored in the memory locations 300 include a unique set of alphanumeric characters, such as an online banking ("OLB") number assigned to clients to distinguish account holders of each account managed by the host party. In other aspects, the user identifiers include a unique set of alphanumeric characters provided by or issued to each user, including, but not limited to, a social security number, a personal identification number, an email address, a username, or a password.

Each memory location of the database 104 storing information connected to the user is associated with the memory location 300 storing the user identifier of the user. For example, the database 104 includes a set of memory locations 302 including the user authentication information for the user. The user authentication information includes at least host authentication information and third-party authentication information. The host authentication information may be used to authenticate the user to view the secure host information stored in the database 104. In some aspects, the host authentication information may also be used to authenticate the user to view any secure third-party information stored in the database 104. The third-party authentication information may be used by the host system 100 to authenticate the host system 100 to retrieve secure third-party information on the third-party system 106 of FIG. 1. In some aspects, the third-party authentication information may be received from the user and stored in the memory location 302 of the database 104 to allow the host system 100 to authenticate automatically the user to retrieve updated secure third-party information from the third-party system 106. The updated secure third-party information may be retrieved in response to the user being authenticated by the host system based on the host authentication information. In some aspects, the host authentication information and the third-party authentication information corresponding to the same user may be stored in the same memory location in the set of memory locations 302. In other aspects, the host authentication information and the third-party authentication information may be stored in separate memory locations in the set, but may be associated with each other in the database 104. Each of the host authentication information and the third-party authentication information stored in the set of memory locations 302 may be associated with the memory location 300 including the user identifier of the user corresponding to the host authentication information and the third-party authentication information.

The secure user information are stored in memory locations that are associated with the memory location 300 including the user identifier of the user that is the holder, manager, owner, or is otherwise associated with the secure user information. The secure user information is stored in sets of memory locations 304, 306, 308. Each set of memory locations 304, 306, 308 may correspond to a type of secure user information and include multiple memory locations for storing secure information corresponding to that type. In some aspects, the type of the secure user information may be identified based on a type identifier corresponding to the information type, an information format unique to the information type, a source identifier corresponding to a system (e.g., the host system 100, the third-party system 106, etc.) for storing information having the information type, or other means for identifying the information type. For example, the secure user information having type A is stored in set of memory locations 304. The set of memory locations 304 includes memory location labeled Location 1-Type A that includes secure host information having type A and a memory location labeled Location 1-Type B that includes secure third-party information having type A. The set of memory locations 304 also include one or more additional memory locations represented by the memory location labeled Location N-Type A. In some aspects, Location N-Type A may be reserved for additional secure information of type A corresponding with the same user. In addition to the association between the memory location 300 having the user identifier of a user with the memory locations 304 having the secure user information of the same user, each of the memory locations 304 may also be associated with each other based on their mutual association with the same user identifier and their same information type.

Each of the sets of memory locations 306, 308 also include secure user information stored in the manner described for the memory locations 304. For example, the set of memory locations 306 may correspond to secure user information having type B. The memory locations 306 include secure host information having type B and secure third-party information having type B in the memory locations labeled Location 1-Type B and Location 2-Type B, respectively. The set of memory locations 308 may correspond to secure user information having type N. The memory locations 308 include secure host information having type N and secure third-party information having type N in the memory locations labeled Location 1-Type N and Location N-Type B, respectively. Each of the sets of memory locations 306, 308 may include one or more additional memory locations (e.g., memory location labeled Location N-Type B, memory location labeled Location N-Type N) that are associated with the other memory locations in the respective set and reserved for additional secure user information of types B and N, respectively.

In some aspects, the secure user information stored in the memory locations of the database 104 may be updated based on a modification of the stored information. For example, a user may choose to modify secure host information having a type N stored in the memory location labeled Location 1-Type N. Subsequent to the modification, modified host information-type N 210 corresponding to the modification may be stored in the memory location in place of the previously stored secure host information having type N. Similarly, a user may choose to modify secure third-party information having a type N stored in the memory location labeled Location 2-Type N. Subsequent to the modification, modified third-party information-type N 212 may be stored in the memory location in place of the previously stored secure third-party information having type N.

In further aspects, additional secure information may be added to the database 104. For example, a new third party may have secure information (e.g., secure new third-party information 314) corresponding to a user of the host system 100. The secure new third-party information 314 may include information having type A and information having type N. The database 104 may store the secure new third-party information 314 having type A in a memory location of the set of memory locations 304 being associated based on the type A. The database 104 may store the secure new third-party information 314 having type N in a memory location of the set of memory locations 308 associated based on the type N. The secure new third-party information 314 may be associated with the user identifier corresponding to the user and with the stored secure user information having the same type based on the memory location in which it is stored.

Figure 4:
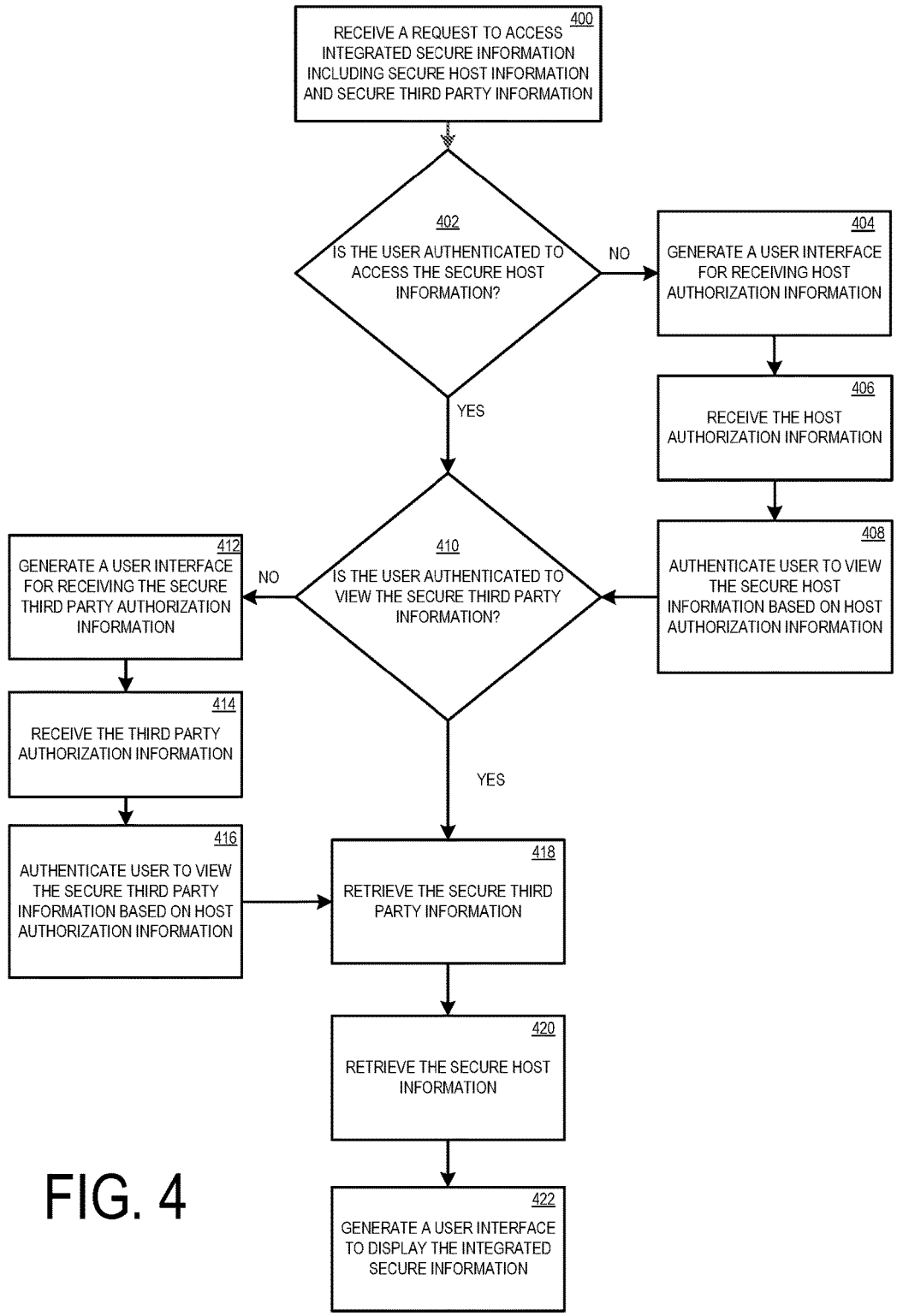
FIG. 4 is a flow chart of a process for generating a user interface to display integrated secure information according to one aspect of the present disclosure.
Figure 7:
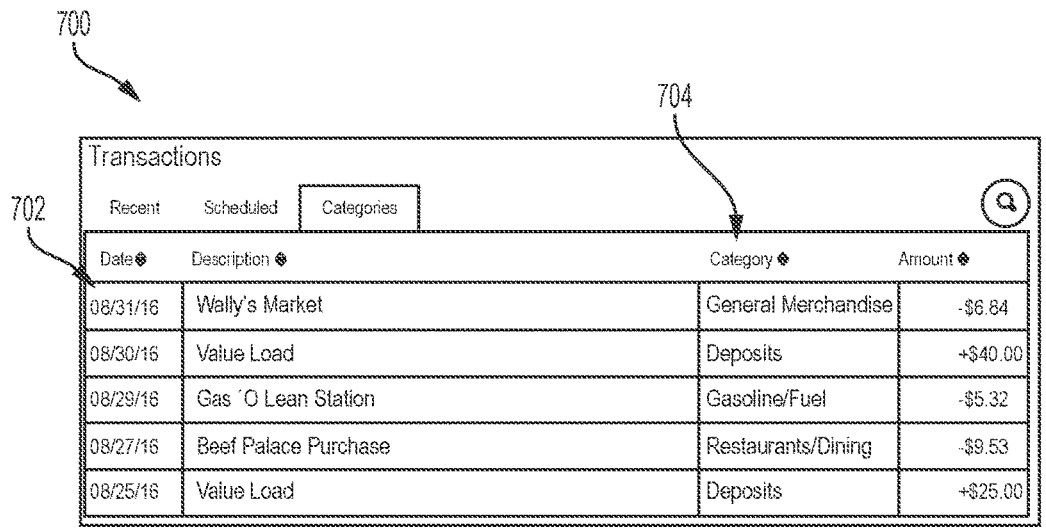
FIG. 7 is an example of a user interface displaying a list of secure user information including an information type according to one aspect of the present disclosure.
Figure 8:
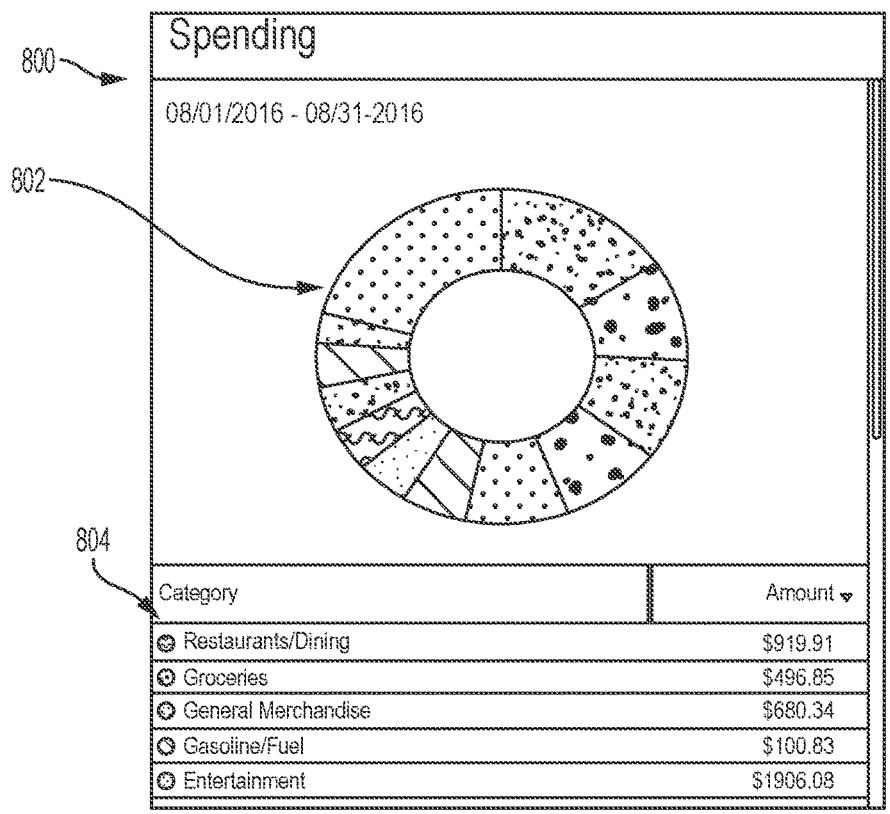
FIG. 8 is an example of a user interface aggregating values corresponding to secure user information of a common type according to one aspect of the present disclosure.
Figure 9:
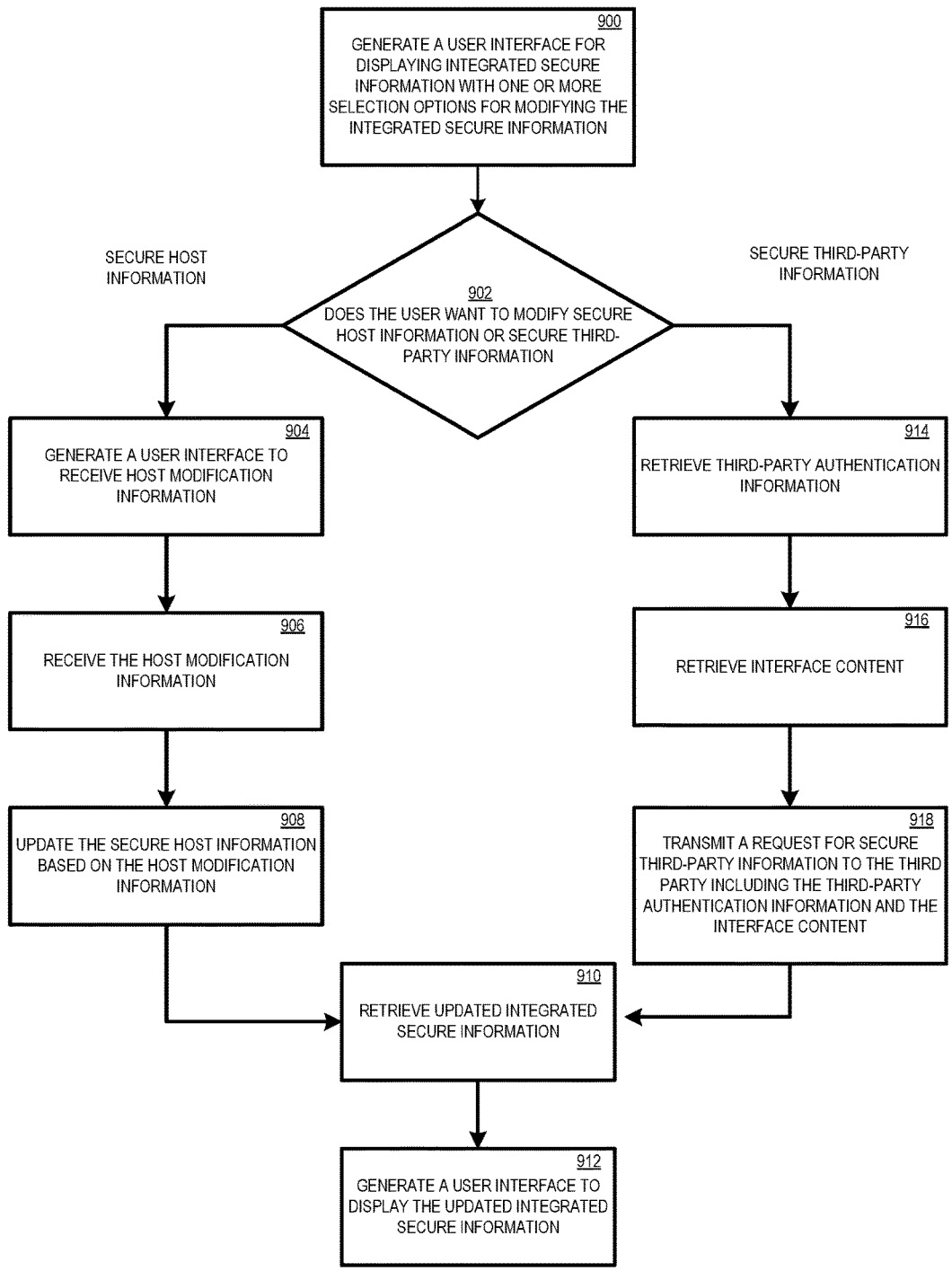
FIG. 9 is flow chart of a process for modifying integrated secure information according to one aspect of the present disclosure.

FIGS. 4-10 include flow charts and corresponding user interfaces illustrating processes for displaying and modifying secure host information and secure third-party information (collectively, integrated secure information). The processes in FIGS. 4 and 9 are described with respect to FIGS. 1-3 and the corresponding screenshots, FIGS. 5-8 and 10, although other implementations are possible without departing from the scope of the present disclosure. Although the processes shown in FIGS. 4 and 9 are described in a particular order, the processing steps may be performed in various orders without departing from the scope of the present disclosure. Similarly, steps in each of the processes may be omitted or performed in alternative ways without departing from the scope of the present disclosure.

Displaying the Integrated Secure Information

FIG. 3 shows a flow chart of a process for generating a user interface to display integrated secure information according to one aspect of the present disclosure.

In block 400, the integration server device 102 receives a request from the user to view the integrated secure information. In some aspects, the request may be received in response to a selection by the user of the user device 110 of an option to view the integrated secure information on a user interface generated by the integration server device 102 or a separate network server device of another system. The selection option may be in the form of a hyperlinked button or text, a direct link inserted into a web browser on the user device 110, or other means for allowing the user to transmit a request to the host system 100 to view the integrated secure information. In additional and alternative aspects, the request may be received in response to an attempt or request by the user to access the host system 100 from the user device 110 via the integration server device 102. The request may be transmitted by the integration server device 102 to the integration server device 102 for a determination of whether the user is authorized to view the integrated secure information.

In block 402, the integration server device 102 may determine whether the user is authorized to view the secure host information. In some aspects, the determination may be made based on whether the user has previously provided authentication information for accessing the host system 100. The authentication information may have been previously provided in response to user input provided by the user on a user interface generated by the integration server device 102. In some aspects, the user may be authorized to view the secure host information based on previous authorization to view secure information on another application. For example, the user may have provided authentication information for another system having means for viewing the same information and hosted by the same entity as the host of the host system 100. The host system 100 may determine that the user is authorized to view the secure host information based on the host authentication information provided to the other system. In additional aspects, the user may be authorized to view the secure host information based on accessing the host system 100 from the user device 110. For example, device information corresponding to the user device 110 may be associated with the user in the database device 104 to allow the user to be authenticated by the host system 100 based on the device information transmitted to the host system 100 with the request to view the integrated secure information from the user device 110.

In block 404, the integration server device 102 generates a user interface for receiving host authentication information in response to a determination by the integration server device 102 that the user is not authorized to view the secure host information. The user interface may include options or inputs to allow the user to provide host authentication information for accessing the host system 100 and viewing the secure host information. The host authentication information may include a username, account number, password, personal identification number, or other information unique to the user to authenticate that the user is permitted to view the secure host information.

FIG. 5 is an example of a user interface 500 for receiving host authentication information according to some aspects of the present disclosure. In some aspects, the user interface 500 may be generated by the integration server device 102 to allow the user to enter host authentication information for accessing the host system 100. The user interface may include inputs 502 to allow the user to enter alphanumeric text from the user device 110 corresponding to a user identifier ("user id") and a password unique to the user. The host authentication information may ensure that the user is authorized to access and view the secure information. Subsequent to a user selection of the "Secure Logon" selection option 504, the user device 110 may transmit the host authentication information to the integration server device 102 via the network 108. The integration server device 102 may transmit the authentication information to the integration server device 102 for authenticating the user.

Returning to FIG. 4, in block 406, the integration server device 102 receives the host authentication information. In some aspects, the host authentication information may be received via a transmission from the user device 110 based on a selection of an option displayed on a user interface for submitting the host authentication information (e.g., selection option 504 of FIG. 5).

In block 408, the integration server device 102 authenticates the user to view the secure host information. In some aspects, the integration server device 102 may authenticate the user if there is a match between the host authentication information transmitted to the integration server device 102 by the user and authentication information stored in the database device 104 and associated with the user. For example, the integration server device 102 may identify the user based on a user identifier stored in the database 104 compared against the user identifier (e.g., username) entered in an input of the user interface for receiving the host authentication information described in block 404 (e.g., inputs 502 of FIG. 5). The integration server device 102 may identify the host authentication information stored in a memory location that is associated with the memory location storing the user identifier and compare the stored host authentication information with the information (e.g., password) entered in the inputs 502 of FIG. 5 to determine the match and authenticate the user.

In block 410, the integration server device 102 determines if the user is authorized to view the secure third-party information. In some aspects, this determination may include comparing previously provided third-party authentication information associated with the user in an associated memory location of the database 104. For example, a user having previously accessed the system may have provided authentication information for viewing the secure third-party information on the third-party system 106. The integration server device 102 may have associated the provided authentication information with the user in the database device 104 to allow the integration server device 102 to authorize automatically the user to view the secure third-party information based on a determination that the user is authorized to view the secure host information (e.g., based on authenticating the user on the host system 100).

In block 412, the integration server device 102 may generate a user interface for receiving the secure third-party authentication information in response to a determination by the integration server device 102 that the user is not authorized to view the secure third-party information. Similar to the user interface 500 of FIG. 5 described in block 404, the user interface may include options or inputs to allow the user to provide third-party authentication information for accessing the host system 100 and viewing the secure third-party information. The third-party authentication information may include a username, account number, password, personal identification number, or other information unique to the user to authenticate that the user is permitted to access and view the secure third-party information.

In block 414, the integration server device 102 receives the third-party authentication information. The third-party authentication information may be received via a transmission from the user device 110 based on a selection of an option displayed on a user interface for submitting the third-party authentication information described in block 406.

In block 416, the integration server device 102 associates the third-party authentication information with the user in the database device 104. The integration server device 102 may associate the third-party authentication information with the user by storing the third-party authentication information in a memory location associated with the memory location including the user identifier for the user. In some aspects, the third-party authentication information may allow the integration server device 102 to authenticate the user on the third-party system 106 to receive the secure third-party information from the third party.

In block 418, the integration server device 102 retrieves the secure third-party information. In some aspects, the integration server device 102 may retrieve the secure third-party information from the third party using the third-party authentication information. For example, the integration server device 102 may transmit a request for the third-party information to the third-party system 106 using the third-party authentication information. The third-party system 106 may authenticate the integration server device 102 based on the third-party authentication information and transmit the third-party authentication information to the integration server device 102. The integration server device 102 may store the information in the database 104 in a manner that associates the secure third-party information with the user. In some aspects, future requests to view the integrated secure information may allow the user to access the secure third-party information stored in the database based on the user being authenticated using the host authentication information. The integration server device 102 may only require the third-party authentication information when requesting updated secure third-party information.

In block 420, the integration server device 102 may retrieve the secure host information corresponding to the user. The integration server device 102 may retrieve the secure host information from the database device 104. In some aspects, the integration server device 102 may retrieve the secure host information based on the memory location being associated with a memory location including the user identifier corresponding to the user.

In block 422, the integration server device 102 may generate a user interface to display the integrated secure information including the secure host information and the secure third-party information. In some aspects, the user interface may allow the secure host information and the secure third-party information to be displayed at the same time. For example, the integration server device 102 may generate a user interface as shown in FIG. 6.

FIG. 6 depicts an example of a user interface 600 for displaying both the secure host information and the secure third-party information together as integrated secure information. The user interface 600 shown in FIG. 6 includes integrated secure information related to banking information. The secure host information may be displayed as an account balance at a host financial institution. The user interface 600 may allow the user to view the integrated secure information on a single user interface.

The user interface 600 includes selection options 602, 604, 606 to toggle between a display of only the secure host information, a display of only the secure third-party information, and a display of the integrated secure information including both the secure host information and the secure third-party information. For example, user interface 600 includes the selection option 602 labeled "Host Accounts," the selection option 604 labeled All Accounts," and the selection option 606 labeled "Show hidden Host Account (s)." Selection of the option 602" may cause the integration server device 102 to generate or modify the user interface displaying only the secure host information (e.g., balance information related to host accounts). Selection of the option 604 may cause the integration server device 102 to generate or modify the user interface displaying the integrated secure information as shown in FIG. 6 (e.g., balance information related to host accounts and third-party accounts). Selection of the "Show hidden host account(s)" may allow the user to toggle between a user interface generated by the integration server device 102 displaying the integrated secure information and a user interface generated by the integration server device 102 displaying only the secure third-party information (e.g., hiding the secure host information from the display).

In additional and alternative aspects, the integration server device 102 may generate user interfaces to display the integrated secure information by one or more information types associated with the secure host information or the secure third-party information. Non-limiting examples of information types may include account types and category types. In some aspects, account types may include a particular type of account (e.g., checking account, credit card account, utility account, etc.) associated with the secure information as indicated by the sections 608, 610, 612 of the user interface 600, respectively. A category type may include a type or transaction or other information regarding a transaction for a particular account (e.g., purchase of a particular item, payments, deposits, withdrawals, etc.). In some aspects, the integration server device 102 may position the integrated secure information on the user interface 600 based on the memory location of the database 104 in which the secure host information and the secure third-party information is stored. In one example, the memory locations may be associated based on the type of information stored in the memory locations as described in FIG. 3. The secure host information and the secure third-party information may include a type "Checking Account" and display the secure host information (e.g., Host Checking) and the secure third-party information (e.g., First Third-Party Checking) in the section 608 labeled Checking and Savings based on the association between the memory locations storing the checking information in the database 104.

In some aspects, the user interface may include selection options to allow a user to see additional secure information related to a displayed account. For example, in the sections 608, 610, 612 corresponding to the different information types, the secure information listed (e.g., the Host Checking, the First Third-Party Checking, the Host Credit Card, and the Third-Party Investment) may be selectable (e.g., via a hyperlink) by the user. In response to a selection of an account, the integration server device 102 may cause additional secure information corresponding to the account to be displayed.

FIG. 7 shows an example of a user interface 700 that may be generated by the integration server device 102 in response to a selection of a selection option corresponding to secure user information in FIG. 6 according to some aspects of the present disclosure. For example, FIG. 7 may be generated in response to a selection of the Host Checking account tin FIG. 6 and show transactions that have occurred for the account.

The user interface 700 includes a list of secure transactions 702 corresponding to the selected account. Different information about each secure transaction 702 is listed included in labeled rows, including a date, description, category, and amount of the transaction 702. In some aspects, the transactions may be stored in memory locations based on the category type associated with the secure transaction as described in FIG. 3. For example, the secure host information may include both the Aug. 30, 2016 and the Aug. 25, 2016 secure transactions stored in associated memory locations based on their having the common category type "Deposits." In some aspects, different metrics may be generated by aggregating the associated information based on the category type.

For example, FIG. 8 shows an example of a user interface 800 including a graphical representation 802 of a total value (e.g., transaction amount) associated with the secure transactions aggregated by category type. The graphical representation 802 corresponds to a variant of a pie chart (e.g., a doughnut chart or circle graph) illustrating the aggregate amounts of the transactions by category in relation to the total amount of purchases for the account. The user interface 800 also includes a list 804 corresponding to the graphical representation 802 with an aggregate total amount for each transaction category.

Modifying the Integrated Secure Information

FIG. 9 is a flow chart of a process for modifying the integrated secure information according to one aspect of the present disclosure.

In block 900, the integration server device 102 generates a user interface displaying the user integrated secure information. The user interface may also include one or more selection options to allow the user to modify the displayed secure host information or the secure third-party information. In FIG. 6, user interface 600 displays integrated secure information as described above in block 422 of FIG. 4. In some aspects, integrated secure information may be displayed as selection options to allow the user to modify the respective piece of secure information selected. For example, user interface 600 shows secure host information including an account balance of $24,760.00 in a host checking account. The user may be able to modify the secure host information by selecting the account balance. The user may select the account balance via a mouse, touch screen, or other selection device available on the user device 110. Similarly, the secure third-party information may also be selected to modify the secure third-party information (e.g., selecting the account balance of $10,135.00 of the first third-party checking account to modify the secure third-party information). Selection of the option to modify the secure host information or the secure third-party information may transmit a request to the integration server device 102 to modify the secure information selected.

Returning to FIG. 9, in block 902, the integration server device 102 determines whether the user has selected an option to modify the secure host information or the secure third-party information. In some aspects, the determination may be based on the selection of an option on a user interface as described in block 900 or as shown in user interface 600 of FIG. 6. For example, the selection of the secure host information may transmit a request to the integration server device 102 to modify the secure host information corresponding to the selection. The request may include an identifier that the integration server device 102 interprets as a request to modify to the secure host information corresponding to the identifier and the selection of the user. Similarly, the selection of the secure third-party information may transmit a request to the integration server device 102 including an identifier that the integration server device 102 interprets as a request to modify to the secure third-party information corresponding to the identifier and the selection of the user. In some aspects, the secure third-party information may be stored on a single third-party system 106 hosted by a single third party. In other aspects, the secure third-party information may include third-party information stored on separate third-party systems 106 hosted by of different third parties.

In block 904, the integration server device 102 generates a user interface to receive host modification information from the user. The user interface may be generated by the integration server device 102 in response to a determination by the integration server device 102 that the user has elected to modify the secure host information displayed on the user interface displaying the integrated secure information described in block 900. The user interface for receiving the host modification information may include selection or input options to allow the user to enter host modification information corresponding to instructions for how to modify the secure host information. Returning to the example user interface shown in Screenshot B, the user may wish to transfer money from the host account shown as the secure host information. The user interface may include selection or input options to facilitate the transfer of money from the host account to a recipient account. In some aspects, the integration server device 102 may generate a series of user interfaces to facilitate the transaction. One or more of the user interfaces may include an additional option to execute the transfer. In response to selection of the additional option, the host modification information may be transferred to the integration server device 102 for modifying the secure host information.

In block 906, the integration server device 102 receives the host modification information. In some aspects, the integration server device 102 may receive the host modification information subsequent to the transmission of the host modification information in response to the selection of an option by the user to execute a transaction.

In block 908, the integration server device 102 modifies the host information based on the host modification information received. In some aspects, the integration server device 102 may directly or indirectly (through another host system) execute the transaction. Specifically, the integration server device 102 may modify the host account to reflect a withdrawal in the amount requested by the user and reflected in the host modification information (e.g., the integration server device 102 may subtract the amount to be transferred from the host account). In some aspects, the integration server device 102 may also modify the recipient account to which the user requested money to be transferred by depositing into the recipient account the amount requested by the user and reflected in the host modification information. The modified account balance or other secure host information may be stored in the memory location of the database 104 to replace the previous information.

In block 910, the integration server device 102 retrieves updated integrated secure information. The updated integrated secure information includes the modified secure host information stored in the database 104 and the secure third-party information associated with the modified secure host information in the database 104 The updated integrated secure information may reflect any modifications to the secure host information or the secure third-party information. For example, the integration server device 102 may retrieve the secure third-party information as described in block 418 of FIG. 4. The integration server device 102 may also retrieve the secure host information as described in block 420 of FIG. 4.

In block 912, the integration server device 102 generates a user interface to display the refreshed integrated secure information as described in block 422 of FIG. 4. The refreshed integrated secure information may include the secure host information and the secure third-party information reflecting any modifications or changes to the secure host information or the secure third-party information. In some aspects, the changes to the integrated secure information may be based on a transaction executed by the host system 100 or another system having access to either the secure host information or the secure third-party information. For example, a host system communicatively coupled to the host system 100 may access the secure host information to execute a financial transaction previously initiated by the user (e.g., a purchase made at a retailer using a transaction card associated with the account corresponding to the secure host information may be subsequently executed by the host system). The refreshed integrated secure information may reflect both the modification of the secure host information described in blocks 402-404 of FIG. 4 as well as the modification to the account by the host system.

In block 914, the integration server device 102 retrieves the third-party authentication information for the user to access the secure third-party information. Retrieving the third-party authentication information may be in response to a determination by the integration server device 102 that the user has elected to modify the secure third-party information displayed on the user interface displaying the integrated secure information described in block 902. The third-party authentication information may be associated with the user identifier stored in the database device 104 and may be retrieved from the database device 104 to transmit to the third party.

In block 916, the integration server device 102 retrieves interface content 216 from the memory 202 of the integration server device 102 or other appropriate storage device. In some aspects, the user interface components may include java script, HTML, or other computer-readable instructions for generating headings, banners, images (e.g., logos of the host party), or other elements of a user interface having visual similarities to the user interfaces generated by the integration server device 102.

In block 918, the integration server device 102 transmits a request to the third party for the secure third-party information. The request may include the third-party authentication information and the interface content 216. The third-party system 106 may authenticate the host system 100 on the third-party system 106 and utilize the user interface components to generate a user interface that appears to be hosted by the host system 100. The user interface generated by the third-party system 106 may allow the user to modify the secure third-party information. The request may be transmitted to the third-party system 106 from the host system 100 via the network 108 or the service bus 112.

The process of FIG. 9 returns to block 910, where the integration server device 102 retrieves the updated integrated secure information.

In some aspects, the host system 100 may require that the user provide the third-party authentication information prior to authenticating the user on the third-party system 106 as described in block 914. For example, the third-party authentication information associated with the user in the database device 104 may not correspond to the information required by the third-party system 106 for authenticating the user to retrieve the secure third-party information (e.g., the user may have modified a password for accessing the third-party system 106 subsequent to accessing the host system 100). The integration server device 102 may generate the user interface displaying the integrated secure information to include secure third-party information previously stored in the database device 104 subsequent to a prior retrieval of the secure third-party information.

FIG. 10 shows an example of a user interface 1000 displaying secure third-party information according to some aspects of the present disclosure. The secure third-party information includes two account balances: (1) a "Checking" account balance of $1000.00, and (2) a "Savings" account balance of $1600.00. Included with the display of the secure third-party information is text indicating when the secure third-party information was retrieved from the third-party system 106. For instance, the "Regular Checking" account shows that the $1000.00 account balance is as of two weeks prior to the present date and the "Regular Savings" account shows that the $1600.00 account balance is as of Aug. 29, 2016.

The user interface includes hazard symbols proximate to the total, "Total $47,673.46," and proximate to the "Regular Checking" account. The hazard symbols may indicate that the secure third-party information displayed on the user interface 1000 is not updated as of the present date. In response to a selection of the hazard symbols (e.g., hovering over the hazard symbol, clicking the hazard symbol via a mouse or touchscreen), the integration server device 102 includes a message 1002 on the user interface indicating that the third-party authentication information is not updated. For example, Screenshot E shows a message in response to a selection of the hazard symbol proximate to the "Regular Checking" account. The message indicates that the third-party authentication information stored in the database device 104 and associated with the user may be insufficient to access the third-party system 106 for retrieving updated secure third-party information. The message includes additional selection options, such as the hyperlinked text labeled "update your log on information" to allow the user to modify third-party authentication information associated with the user. In response to selecting the hyperlinked text to update the third-party authentication information, the integration server device 102 may generate one or a series of user interfaces to receive updated third-party authentication information as input. The integration server device 102 may update the memory location including the outdated authentication information with the new third-party authentication information to associate the third-party authentication information with the user identifier.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system, comprising:
a processor coupled to a database having a plurality of memory locations; and
a memory device accessible to the processor and comprising instructions that are executable by the processor to cause the processor to:
authenticate, by communicatively coupling the system to a user device via a network, a user of the user device to access secure host information associated with the user in the database;
transmit a request to a third-party system to access secure third-party information stored by a third-party, the request including third-party authentication information associated with the user and stored in the database for authenticating a host party by the third-party system;
receive (i) secure host information corresponding to the user and (ii) secure third-party information corresponding to the user;
store the secure host information and the secure third-party information in a subset of memory locations of the plurality of memory locations;
associate memory locations of the subset with each other based on a common information type corresponding to a common type of the secure host information and the secure third-party information stored in the subset;
associate the subset with a stored user identifier corresponding to the user; and
create a graphical user interface that includes the secure host information and the secure third-party information positioned on the graphical user interface based on a location of the secure host information and the secure third-party information in the database.

2. The system of claim 1, wherein the memory device comprises instructions that are executable by the processor to cause the processor to:
transmit a request for updated secure third-party information from the host party to the third-party system, the request including the third-party authentication information;
receive the updated secure third-party information;
store the updated secure third-party information in the subset of memory locations based on at least one information type corresponding to the updated secure third-party information; and
create an updated graphical user interface including the secure host information and the updated secure third-party information by positioning the secure host information and the updated secure third-party information in the updated graphical user interface based on the location of the secure host information and the updated secure third-party information in the database.

3. The system of claim 1, wherein the memory device comprises instructions that are executable by the processor to cause the processor to modify the secure third-party information stored in the database by:
transmitting a request to modify the secure third-party information to the third-party system, the request including the third-party authentication information and interface content usable by the third-party system to generate a user interface for modifying the secure third-party information.

4. The system of claim 3, wherein the interface content includes interface instructions usable by the third-party system to generate the user interface having visual elements associated with the host party.

5. The system of claim 1, wherein the memory device includes stored host authentication information usable to authenticate the user to access the secure host information on a host website hosted by the host party and stored third-party authentication information usable to authenticate the system to retrieve updated secure third-party information from the third-party system,
wherein the memory device comprises instructions that are executable by the processor to cause the processor to retrieve the secure third-party information from the third-party system using the third-party authentication information in response to authenticating the user based on the host authentication information.

6. The system of claim 1, wherein the memory device comprises instructions that are executable by the processor to cause the processor to determine one or more aggregated values corresponding to the secure host information and the secure third-party information stored in the subset of memory locations.

7. The system of claim 6, wherein the memory device further comprises instructions that are executable by the processor to cause the processor to generate a user interface including a graphical representation of the one or more aggregated values.

8. A method, comprising:
authenticating, by a host system communicatively coupling to a user device via a network, a user of the user device to access secure host information associated with the user in a database that is coupled to a processor, the database having a plurality of memory locations;
transmitting, by the host system, a request to a third-party system to access secure third-party information stored by a third party, the request including third-party authentication information associated with the user and stored in the database for authenticating a host party by the third-party system;
receiving, by the host system, (i) secure host information corresponding to the user and (ii) the secure third-party information corresponding to the user;
storing, by the host system, the secure host information and the secure third-party information in a subset of memory locations of the plurality of memory locations;
associating memory locations of the subset with each other based on a common information type corresponding to a common type of the secure host information and the secure third-party information stored in the subset;
associate the subset with a stored user identifier corresponding to the user; and creating, by the host system, a graphical user interface that includes the secure host information and the secure third-party information positioned in the graphical user interface based on a location of the secure host information and the secure third-party information stored in the database.

9. The method of claim 8, further comprising:
transmitting, by the host system, a second request for updated secure third-party information to the third-party system, the second request including the third-party authentication information;
receiving, by the host system, the updated secure third-party information from the third-party system, the secure third-party information having the common information type;
storing the updated secure third-party information in the memory location of the database to associate the updated secure third-party information and the secure host information in the database based on the common information type; and
creating an updated graphical user interface including the secure host information and the updated secure third-party information by positioning the secure host information and the updated secure third-party information in the updated graphical user interface based on the location of the secure host information and the updated secure third-party information in the database.

10. The method of claim 8, further comprising:
transmitting, by the host system, a second request to modify the secure third-party information to the third-party system, the second request including the third-party authentication information and interface content usable by the third-party system to generate a user interface for modifying the secure third-party information.

11. The method of claim 10, further comprising receiving updated secure third-party information in response to the third-party system modifying the secure third-party information based on user input via the user interface generated by the third-party system using the interface content.

12. The method of claim 10, wherein the interface content includes interface instructions usable by the third-party system to generate the user interface having visual elements associated with the host party.

13. The method of claim 8, wherein authenticating the user to access the secure host information includes receiving user input corresponding to host authentication information stored in the database,
wherein transmitting the request to the third-party system to access the secure third-party information includes identifying the third-party authentication information based on an association between the host authentication information and the third-party authentication information in the database.

14. The method of claim 8, further comprising:
determining one or more aggregated values corresponding to the secure host information and the secure third-party information; and
generating a user interface including a graphical representation of the one or more aggregated values.

15. A non-transitory computer-readable medium having instructions stored thereon that are executable by a processor to perform operations, the operations comprising:
authenticating a user of a user device to access secure host information associated with the user in a database that is coupled to a processor, the database having a plurality of memory locations;

transmitting a request to a third-party system to access secure third-party information stored by a third party, the request including third-party authentication information associated with the user and stored in the database for authenticating a host party by the third-party system;
receiving (i) secure host information corresponding to the user and (ii) the secure third-party information corresponding to the user;
storing the secure host information and the secure third-party information in a subset of memory locations of the plurality of memory locations;
associating memory locations of the subset with each other based on a common information type corresponding to a common type of the secure host information and the secure third-party information stored in the subset;
associate the subset with a stored user identifier corresponding to the user; and
creating a graphical user interface that includes the secure host information and the secure third-party information positioned in the graphical user interface based on a location of the secure host information and the secure third-party information stored in the database.

16. The computer-readable medium of claim 15, wherein the operations further comprise:
transmitting a second request for updated secure third-party information to the third-party system, the second request including the third-party authentication information;
receiving the updated secure third-party information from the third-party system, the secure third-party information having the common information type;
storing the updated secure third-party information in the memory location of the database to associate the updated secure third-party information and the secure host information in the database based on the common information type; and
creating an updated graphical user interface including the secure host information and the updated secure third-party information by positioning the secure host information and the updated secure third-party information in the updated graphical user interface based on the location of the secure host information and the updated secure third-party information in the database.

17. The computer-readable medium of claim 15, wherein the operations further comprise:
transmitting a second request to modify the secure third-party information to the third-party system, the second request including the third-party authentication information and interface content usable by the third-party system to generate a user interface for modifying the secure third-party information.

18. The computer-readable medium of claim 17, wherein the operations further comprise: receiving updated secure third-party information in response to the third-party system modifying the secure third-party information based on user input via the user interface generated by the third-party system using the interface content.

19. The computer-readable medium of claim 17, wherein the interface content includes interface instructions usable by the third-party system to generate the user interface having visual elements associated with the host party.

20. The computer-readable medium of claim 15, wherein the operations further comprise:

determining one or more aggregated values corresponding to the secure host information and the secure third-party information; and generating a user interface including a graphical representation of the one or more aggregated values.

* * * * *